(No Model.)

S. G. THOMPSON.
TWO WHEELED VEHICLE

No. 257,254. Patented May 2, 1882.

Witnesses
Geo. H. Strong
Frank A. Brooks

Inventor
Samuel G. Thompson
By Dewey & Co. Att'ys

UNITED STATES PATENT OFFICE.

SAMUEL G. THOMPSON, OF SANTA ROSA, CALIFORNIA.

TWO-WHEELED VEHICLE.

SPECIFICATION forming part of Letters Patent No. 257,254, dated May 2, 1882.

Application filed February 11, 1882. (No model.)

*To all whom it may concern:*

Be it known that I, SAMUEL G. THOMPSON, of Santa Rosa, county of Sonoma, State of California, have invented an Improved Two-Wheeled Vehicle; and I hereby declare the following to be a full, clear, and exact description thereof.

My invention relates to that class of two-wheeled vehicles known as "carts;" and it consists in a peculiar and novel arrangement of the shafts, axle, springs, body, and foot-board, whereby the unpleasant motion or jogging of the horse is prevented from being communicated to the seat, and the vehicle thus rendered a pleasant and easy conveyance.

The novel arrangement first consists in hinging the shafts to the axle, thus making their movement an independent one, not communicated to the axle, and also providing for their removal for the substitution of a pole when desired. It consists, next, in providing against the too great play or movement of the seat and axle, which by reason of not being rigidly fixed to the shafts would naturally turn unpleasantly. This is accomplished by means of a supplementary spring-connection, thus steadying the body by securing it to the shafts, and yet allowing the latter to have their independent play between limits without affecting the body. It consists, lastly, in hinging the foot-board, and connecting it by a spring with the shafts or cross-bar between them.

For a more particular description of my invention, reference is made to the following specification and accompanying drawings.

Figure 1:
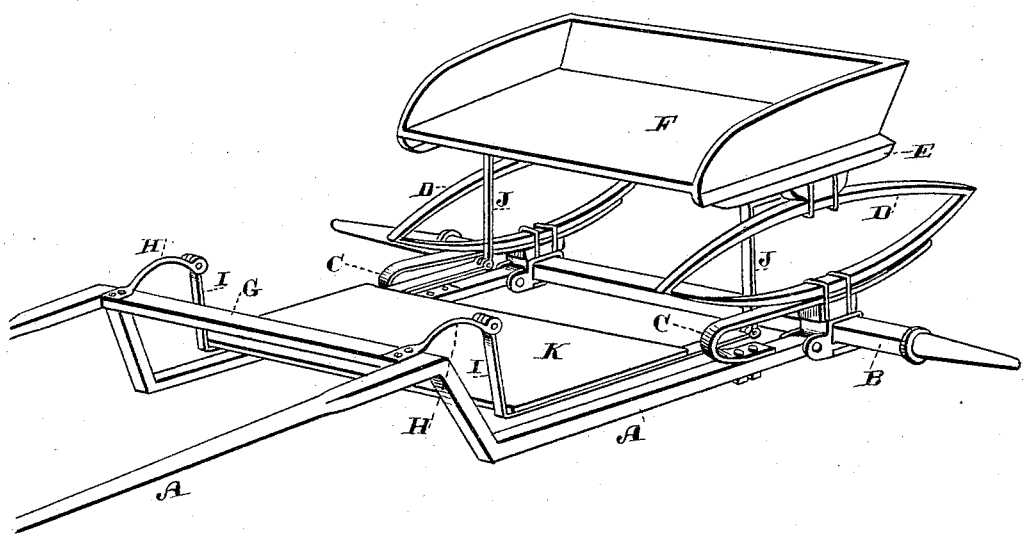
Figure 2:
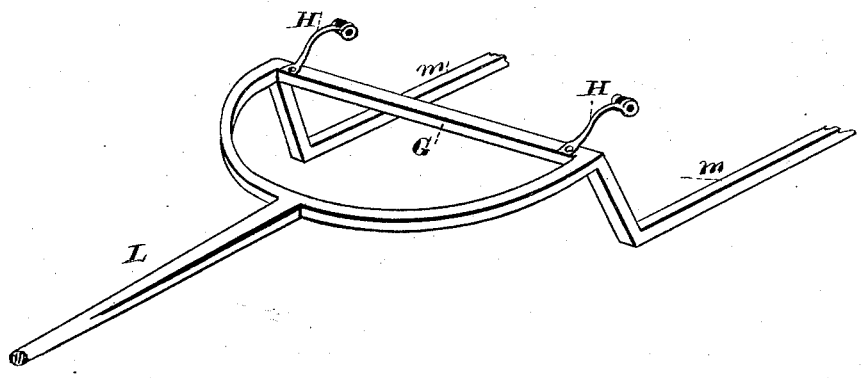

Figure 1 is a perspective view of my vehicle. Fig. 2 shows the pole adapted to be substituted for the shafts.

Let A represent a shaft of a vehicle, preferably made, for the sake of convenience, as shown, its rear end being hinged to the axle B by any suitable forms of thill-coupling, as in the case of other vehicles. The shaft can thus have a motion up and down without affecting the axle and the body, which is secured above.

In two-wheeled vehicles, in order to prevent the axle from turning upon itself and throwing backward the body, it is usually connected firmly with the shafts, and is thus held in place by the harness upon the horse. The two being thus joined, every motion of the shafts is communicated to the body, and the jogging motion of the horse is so unpleasant that the cart is considered an undesirable conveyance. By hinging the shafts as shown I allow them to have an independent motion; but some provision must be made to prevent the body and axle from turning. I therefore join them to the shafts, not rigidly, but by a spring-connection.

Upon the axle or the spring-block thereon is a spring, C. This is curved backward and upward. Its other end extends forward, and is then bent under upon itself, and is bolted to the shaft A forward of the axle. Upon this spring is the ordinary elliptical side spring, D, the two being clipped together to the spring-block and axle. The rear end of spring C follows the curve of and supports the back of spring D. Upon spring D is the side bar, E, secured upon which is the body or seat F. The effect of this construction is as follows: The body is secured from turning and still is not affected by every movement of the shafts. These latter ordinarily would not affect the body at all if there were no connection between them, and in the present case they therefore affect it only to the extent of the connection—namely, through the spring C. If the shafts rise, the weight of the rider causes the body to remain straight by pressing down upon and causing spring C to yield in front. If they fall, the weight is thrown back, and the body still is straight. Thus the seat is not affected, but by having its spring-connection is enabled to counteract the motion of the shafts and remain steady, having only the natural spring from the springs D.

In order to provide for the foot-rest and render it easy without affecting the body, I have the following:

G is a cross-bar between the shafts. It has at each end a spring iron or arm, H. To this is hinged a side strap, I, extending downwardly and backwardly to a point in front of the axle. It is here hinged to an upright strap, J, which is secured under the body of the vehicle. The strap I is here shown upon one side, another like it is upon the other side, and the foot-board K is supported upon them. The weight of the feet affects the spring-arm H and renders the foot-rest easy, while the strap I, being hinged to the arm H, makes it independent of the motion of the shafts. Being hinged again to straps J keeps it from affecting the body. This construction enables me to remove the shafts and to substitute a pole when desired. To do this I first unbolt springs C from the shafts and unhinge the latter from the axle. I also unhinge the foot-board from the spring-arms H. The pole L, I substitute will be represented in Fig. 2, having behind the cross-bar G separating-arms $m$, formed like the shafts. The ends of these arms are hinged to the axle, and have bolted to them the connecting-springs C, and to the spring-arms H is hinged the foot-board, as before described.

Although I have here shown the connection between the body and the shafts as being affected through the spring C, I could use any other form of spring—as, for example, a spiral spring secured to the shaft and to the elliptical spring D above to effect the same result.

Having thus described my invention, what I claim as new, and desire to secure by Letters Patent, is—

1. In a two-wheeled vehicle, the shafts A, hinged to the axle, in combination with the seat-sustaining springs D, and the connecting-springs C, secured to the axle, and springs D, and to the shafts, substantially as and for the purpose herein described.

2. In a two-wheeled vehicle, the shafts A, having a cross-bar, G, and spring-arms H, in combination with the foot-rest-supporting straps I, hinged to the spring-arms, and straps J, secured to the body and hinged to strips I, substantially as and for the purpose herein described.

3. In a two-wheeled vehicle, the shafts A, hinged to the axle and seat-sustaining springs D, connected by supplementary springs C with the shafts, for the purpose described, in combination with the foot-board K, supported upon strips I, hinged to the spring-arms H and to the straps J, secured to the seat, substantially as and for the purpose herein described.

In witness whereof I hereunto set my hand.

SAMUEL G. THOMPSON.

Witnesses:
J. B. GINTHER,
E. T. NAYLER.